United States Patent [19]

Kim

[11] Patent Number: 5,526,321
[45] Date of Patent: Jun. 11, 1996

[54] METHOD OF AND APPARATUS FOR MEASURING DISTANCE TO AN OBSTACLE UTILIZING AN ULTRASONIC WAVE SENSOR

[75] Inventor: Ji-Hyun Kim, Seoul, Rep. of Korea

[73] Assignee: Samsung Electronics Co., Ltd., Suwon, Rep. of Korea

[21] Appl. No.: 267,544

[22] Filed: Jun. 29, 1994

[30] Foreign Application Priority Data

Jun. 29, 1993 [KR] Rep. of Korea ............. 93-11953

[51] Int. Cl.[6] .................................................. G01S 15/08
[52] U.S. Cl. ........................................ 367/99; 367/98
[58] Field of Search ................................ 367/99, 98, 105

[56] References Cited

U.S. PATENT DOCUMENTS 4,315,325  2/1982  Blades ........................................ 367/98
4,887,246  12/1989  Hossack et al. ............................ 367/105

FOREIGN PATENT DOCUMENTS 4-168508  6/1992  Japan .

*Primary Examiner*—Daniel T. Pihulic
*Attorney, Agent, or Firm*—Burns, Doane, Swecker & Mathis

[57] ABSTRACT

The present invention relates to a method and apparatus for measuring distance to an obstacle which can be equipped to a self-propelled robot, and more particularly to a method and apparatus for measuring distinct to an obstacle which can improve distance resolution not by relying on an analog-to-digital conversion time but by relying on a system clock (main clock). The invention can distinguish noise by varying a reference voltage in order to discriminate whether the same is the signal reflected from the obstacle and received thereform, and can distinguish an accurate measurement by mutual comparison after measuring the distance by way of the two methods to thereby detect accurately the distance to the obstacle.

3 Claims, 5 Drawing Sheets

METHOD OF AND APPARATUS FOR MEASURING DISTANCE TO AN OBSTACLE UTILIZING AN ULTRASONIC WAVE SENSOR

BACKGROUND OF THE INVENTION

1. Field of the Invention

The present invention relates to a method and apparatus for measuring distance to an obstacle which can be equipped to a self-propelled robot and the like, and more particularly to a method and for measuring distance to an obstacle which can improve distance resolution not by relying on an analog-to-digital conversion time but by relying on a system clock (main clock). The invention can distinguish noise by varying a reference voltage in order to discriminate whether the same is a signal reflected from the obstacle and received therefrom and can distinguish an accurate measurement by mutual comparison after measuring the distance by way of two methods to thereby detect accurately the distance to the obstacle.

2. Description of the Prior Art

An ultrasonic wave sensor has been conventionally used for measuring a distance to an obstacle in the case of a moving robot with which movement and obstacle detection are possible.

Because the ultrasonic wave moves approximately 34D meters per second, a distance to an obstacle can be calculated by measuring the transmitted and received time of the ultrasonic wave.

In other words, the distance to the obstacle has been measured by calculating a time between reflection of an ultrasonic wave transmitted to the obstacle and receipt of the same.

A distance measuring apparatus of a moving robot utilizing the ultrasonic wave thus described, for the most part, has used a plurality of ultrasonic wave sensors in consideration of various states of the obstacles, and the distance to the obstacle is measured by operating each ultrasonic wave sensor in due sequence out of the plurality of ultrasonic wave sensors.

However, sequential operation of each sensor takes considerable time until the distance measurement by way of the plurality of sensors is completed, to thereby bring about a problem in that capability of detecting the distance to the obstacle is reduced.

A Japanese patent No. Hei 4-168508, entitled "moving robot" has somewhat solved the aforementioned problem.

The "moving robot" disclosed in the Japanese patent No. Hei 4-168508 for enabling detection of a moving object and obstacle comprises: a plurality of distance measuring ultrasonic wave sensors for transmitting ultrasonic waves in the same direction to thereby measure a distance to an obstacle; a distance measurement control means for simultaneously activating the ultrasonic wave sensors to thereby perform simultaneous multiple distance measurements and for adopting as a shortest distance to the obstacle a minimum value out of multiple measurements of distance values obtained as a result of the distance measurement.

The moving robot comprises 7 ultrasonic wave sensors for distance measurement of forward movement, 2 ultrasonic wave sensors for distance measurement of each left and right side, totalling 9 sensors. If all 9 sensors are simultaneously activated, measurement time for each direction can be shortened by ⅓ with measurement by activation of 9 sensors in sequence.

In other words, if an operation interval of each distance measuring ultrasonic wave sensor is given as 100 msec, it takes 900 msec to complete the distance measurement with 9 sensors operated in sequence.

However, if the ultrasonic wave sensors for distance measurement of forward movement are all activated at the same time, obstacle detection of forward, left and right sides can be completed in 300 msec.

In the case of the moving robot for detecting obstacles by utilizing ultrasonic wave sensors thus described, an Analogue-to-Digital Converter ADC of a microcomputer has been used in order to detect whether or not the ultrasonic waves are received.

In other words, the microcomputer checks signals being input to a conversion terminal of the ADC at a predetermined time interval (Analogue-to-Digital (AD) conversion time) to thereby determine whether or not the ultrasonic waves are received (determine whether or not digitalized signals are input), and if the ultrasonic waves are received, a distance to the obstacle is calculated by transmission-receipt time of the ultrasonic waves.

However, this kind of conventional distance measurement apparatus has a drawback in it has a low distance resolution.

By way of example, if the A/D conversion is performed at 1 msec intervals the ultrasonic wave can travel 34 cm 1 sec:340 m= 1 msec:34 cm), and if a round trip of transmission and receipt is taken into account, the ultrasonic wave is reflected and received from an object approximately 17 cm away, after the transmission of the ultrasonic wave, which means that the distance measurement apparatus has a distance resolution of 17 cm if the A/D conversion is performed every 1 msec, and it means that 18–34 cm can be discriminated as the same distance.

Therefore, in order to have a resolution of 1 cm, the A/D conversion should be performed approximately every 58 μsec, and in the conventional microcomputer, if the A/D conversion is performed for every short time like this, the microcomputer cannot perform other operations, and in the worst case, becomes inoperable.

Accordingly, the conventional distance resolution has been over 5 cm.

In the case of the self-propelled robot for conducting a certain operation (for example, forward movement, mapping data accumulation and the like) by detecting obstacles, an accurate movement cannot be done due to the limit in the distance resolution of approximately 5 Cm.

SUMMARY OF THE INVENTION

Accordingly, the present invention has been disclosed to solve the abovementioned problems, and it is an object of the present invention to provide an apparatus of distance measurement of an obstacle and a method thereof utilizing an ultrasonic wave sensor by which a resolution of distance measurement of an obstacle can be improved. The invention enables the self-propelled robot to perform an accurate measurement not by counting an elapsed time of the ultrasonic wave according to an analogue-to-digital conversion time until the ultrasonic wave is received again after being transmitted from an ultrasonic wave sensor, but by counting the elapsed time of the ultrasonic wave according to a main clock time of a microcomputer, in measurement of distance to the obstacle by way of receipt of the ultrasonic wave reflected from the obstacle.

In accordance with one aspect of the present invention, there is provided an apparatus of distance measurement of an obstacle utilizing an ultrasonic wave sensor, the apparatus comprising: an ultrasonic wave sensor for transmitting and receiving the ultrasonic waves; and a microcomputer for calculating a distance to the obstacle by counting a system clock until the ultrasonic wave is received through the ultrasonic wave sensor after the ultrasonic wave is transmitted to and reflected from the obstacle.

In accordance with another aspect of the present invention, there is provided a method of distance measurement of an obstacle utilizing an ultrasonic wave sensor, the method comprising: an ultrasonic wave transmitting step for driving the ultrasonic wave sensor to transmit the ultrasonic wave and simultaneously to count the main clock; and a distance operation step for stopping the count of the main clock to thereby calculate the distance to the obstacle by way of count number of the main clock when the ultrasonic waves are reflected from the obstacle and then received after the ultrasonic wave transmitting step.

BRIEF DESCRIPTION OF THE DRAWINGS

For fuller understanding of the nature and objects of the invention, reference should be made to the following detailed description taken in conjunction with the accompanying drawings in which:

FIG. 3A is an input signal waveform drawing of a terminal (A/D) of the microcomputer, FIG. 3B is an output signal waveform drawing of a terminal (D/A) of the microcomputer, and FIG. 3C is an input signal waveform drawing of a terminal (INT) of the microcomputer;

DETAILED DESCRIPTION OF THE INVENTION

The embodiment of the present invention will be described in detail with reference to the accompanying drawings.

Figure 1:
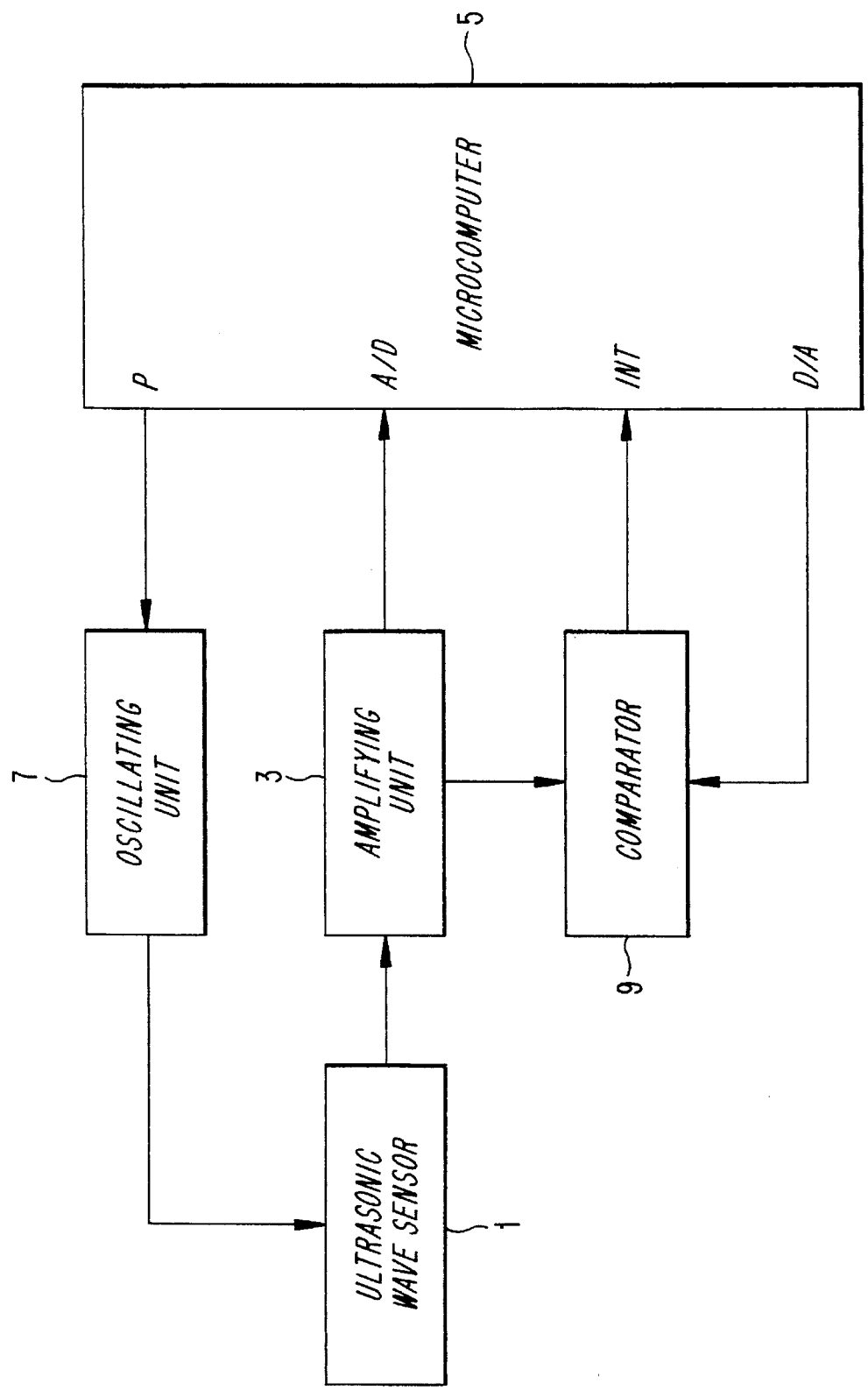
FIG.1 is a block diagram of one embodiment for an apparatus of distance measurement of an obstacle utilizing an ultrasonic wave sensor according to the present invention.

FIG. 1 is a block diagram of one embodiment for the apparatus of distance measurement of an obstacle utilizing the ultrasonic wave sensor according to the present invention.

In FIG. 1, reference numeral 1 is an ultrasonic wave sensor, where, the sensor 1 emits ultrasonic waves to space and receives a signal reflected from the obstacle when the emitted ultrasonic waves hit the remotely-located obstacle.

Reference numeral 3 is an amplifying unit for amplifying the signal reflected from the obstacle.

Reference numeral 5 is a microcomputer for performing operation on the distance to the obstacle by receiving ultrasonic waves through the amplifying unit 3 to the terminal (A/D) and for controlling overall operations of the apparatus according to the present invention when the ultrasonic waves emitted to the space through the ultrasonic wave sensor 1 are reflected from the obstacle to thereby be received again by the ultrasonic wave sensor 1.

Reference numeral 7 is an oscillating unit for raising to a high voltage a driving pulse output from an output terminal (P) of the microcomputer 5 to thereby drive the ultrasonic wave sensor 1.

Reference numeral 9 is a comparator for comparing a comparative reference signal output from an output terminal (D/A) of the microcomputer 5 with a signal input from the amplifying unit 3 to thereby input a result therefrom to the input terminal (INT) of the microcomputer 5, so that an actual distance to the obstacle can be calculated by the microcomputer 5.

Next, operating sequences at each abovementioned unit will be described with reference to the detailed circuit diagram in FIG. 2.

The oscillating unit 7 raises the driving pulse (for instance, a rectangular wave of 50 KHz) output from the microcomputer 5 to a high voltage (approximately 400 V) which can drive the ultrasonic wave sensor 1.

In other words, when the driving pulse generated from the output terminal (P) of the microcomputer 5 is supplied to a primary coil (L1) of a step-up transformer (T1) through transistors Q1 and Q2 of the oscillating unit 7, the high voltage is generated at a secondary coil (L2) of the step-up transformer (T1) for driving the ultrasonic wave sensor 1.

The driving pulse of high voltage is input to the ultrasonic wave sensor 1 to thereby cause the ultrasonic waves to be radiated to the space.

At this time, the signal radiated to the space by the ultrasonic wave sensor 1 is amplified at the amplifying unit 3 has it is, and is input to the terminal (A/D) of the microcomputer 5, and, at the same time, is input to the terminal (INT) through the comparator 9.

Meanwhile, the ultrasonic waves output from the ultrasonic wave sensor 1 are reflected from the obstacle and are received again by the ultrasonic wave sensor 1.

The signal received at the ultrasonic wave sensor 1 is amplified by the amplifying unit 3 to thereafter be input to the terminal (A/D) of the microcomputer 5 and simultaneously is input to the terminal (INT) through the comparator 9.

In other words, the signal reflected from the obstacle and received by the ultrasonic wave sensor 1 is supplied to an inverting terminal (−) of an operation amplifier (OP1) through the secondary coil (L2) and a resistor (R6) of the transformer (T1), is thereafter amplified by the amplifier (OP1), and is input to the terminal (A/D) of the microcomputer 5.

The signal is supplied simultaneously to a non-inverting terminal (+) of the comparator through the resistor (R8).

The comparator 9 receives the comparative reference signal output from the output terminal (D/A) of the microcomputer 5 through a resistor (R9) to thereby compare the same with an amplified signal output from the amplifying unit 3 and to supply a compared signal resultant therefrom to the input terminal (INT) of the microcomputer 5.

The microcomputer detects the transmitted and received time of the ultrasonic waves by way of the signal supplied to the terminal (A/D) and, at the same time, counts the system clock to thereby detect the transmitted and received time of the ultrasonic waves from a time when the transmission of the ultrasonic waves are detected by the signal input to the terminal (INT) to a time when the ultrasonic waves are received by the ultrasonic wave sensor 1 and the signal output from the output terminal of the comparator 9 is input to the terminal (INT).

Accordingly, the microcomputer can determine the distance to the obstacle by way of the transmitted and received time detected by the signal supplied to the terminal (A/D) and can determine the distance to the obstacle by way of the transmitted and received time detected by the signal supplied to the terminal (INT).

Figure 4A:
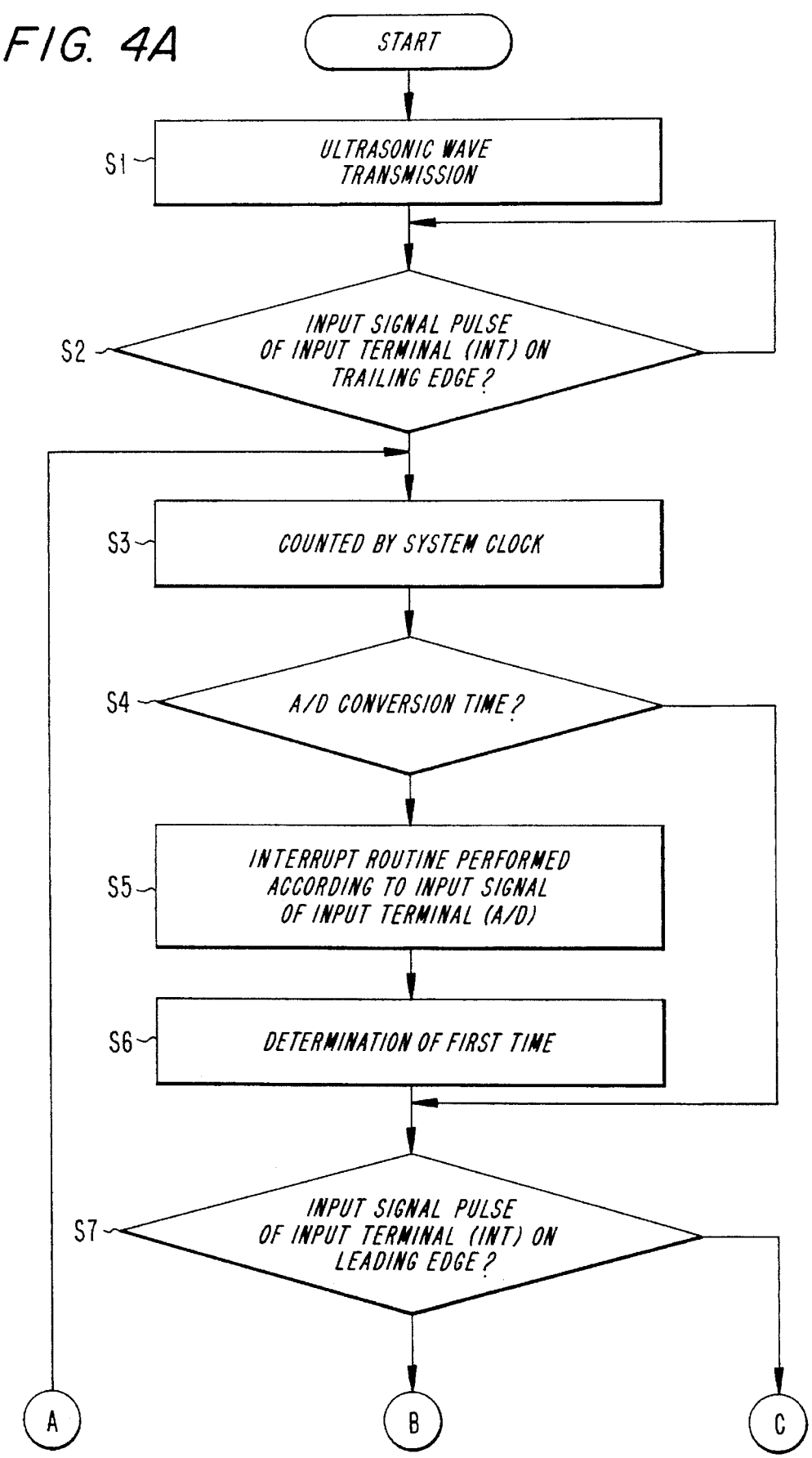
FIGS. 4A and 4B are flow charts of the embodiment for illustrating a method of distance measurement of an obstacle utilizing an ultrasonic wave sensor according to the present invention.
Figure 4B:
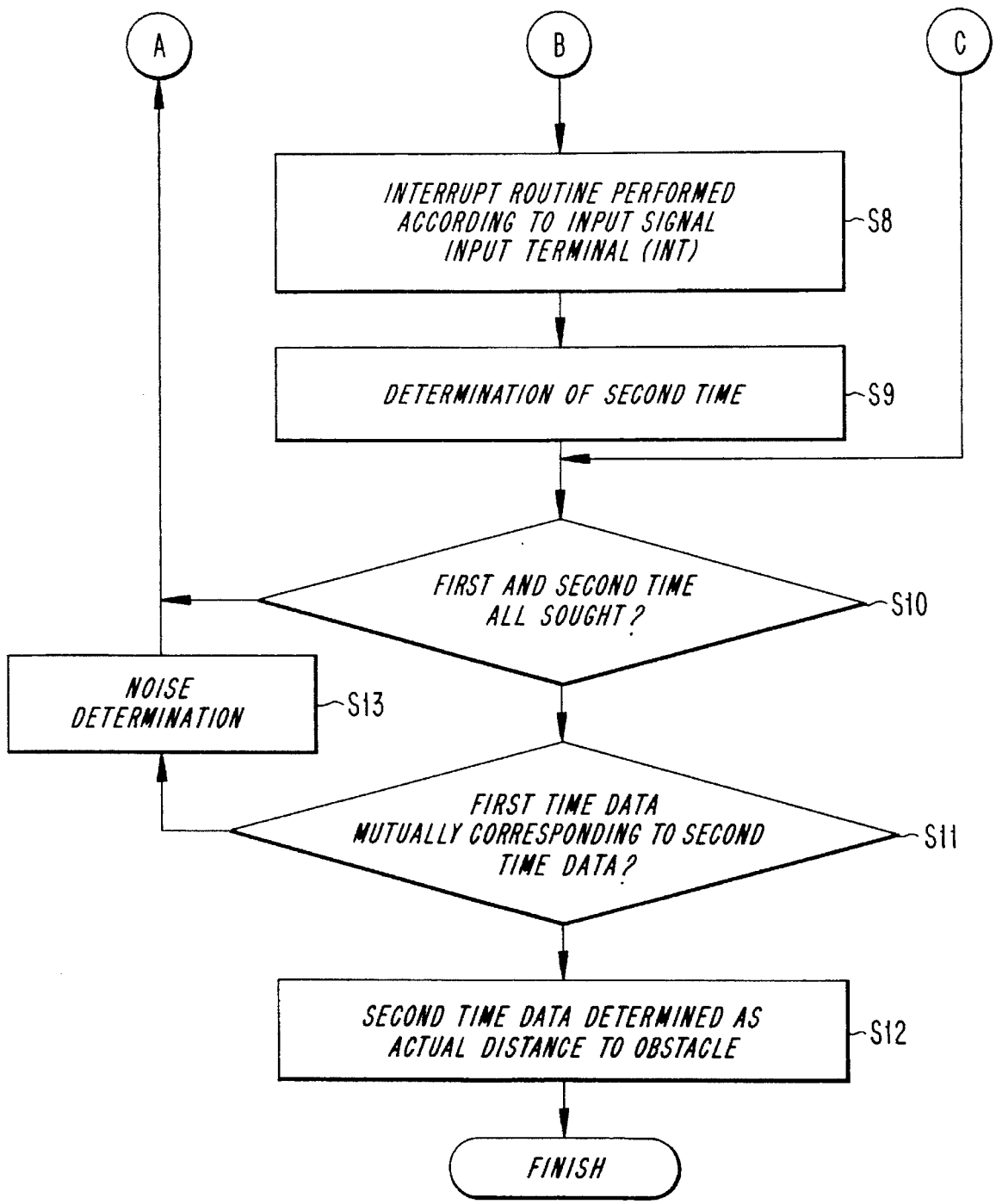

Hereinafter, a distance measurement method of an obstacle utilizing an ultrasonic wave sensor according to the present invention will be described with reference to the flow chart illustrated in FIGS. 4A and 4B.

Reference symbol S in the drawing represents step.

Figure 2:
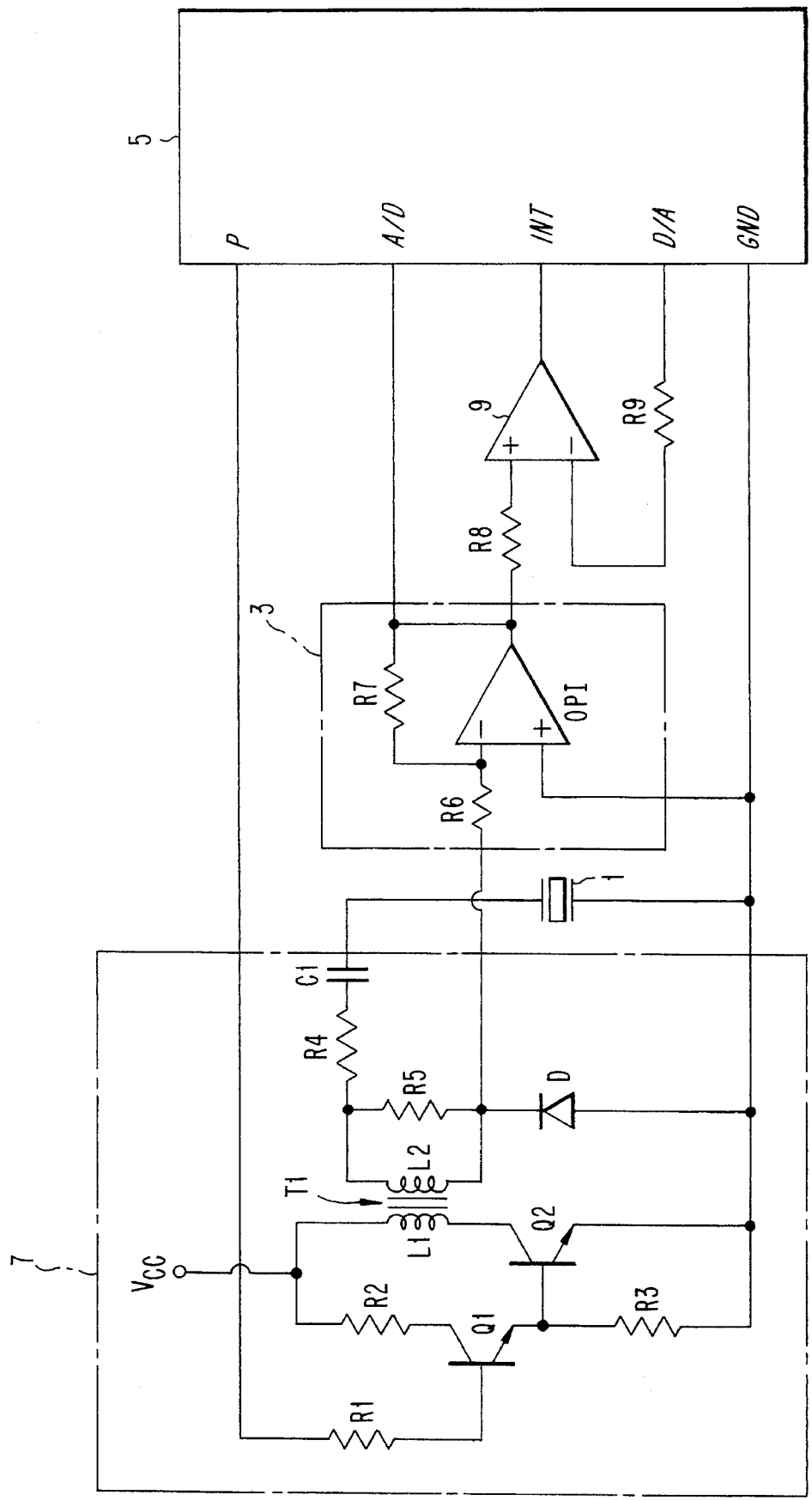
FIG. 2 is a detailed circuit diagram of the embodiment for an apparatus of distance measurement of an obstacle utilizing an ultrasonic wave sensor according to the present invention.

First of all, as illustrated in FIG. 1 or FIG. 2, when power is supplied from an electric power source (not shown) to an apparatus of distance measurement of an obstacle, the system is initialized according to a control program within the microcomputer 5 to thereby start the operation.

When the system starts the operation, ultrasonic waves are transmitted at step 1 (S1).

In other words, when the miorocomputer 5 outputs a pulse signal through a pulse terminal (P), the oscillating unit 7 raises to high voltage the driving pulse output from the microcomputer 5 to thereby output the same to the ultrasonic wave sensor 1.

The ultrasonic wave sensor 1 radiates the ultrasonic waves to the space in order to detect the obstacle.

At this time, the driving pulse signal output from the oscillating unit 7 is output to the ultrasonic wave sensor 1, and at the same time, is supplied into an inverting terminal (−) of the operation amplifier (OP1) comprising the amplifying unit 3.

Figure 3A:
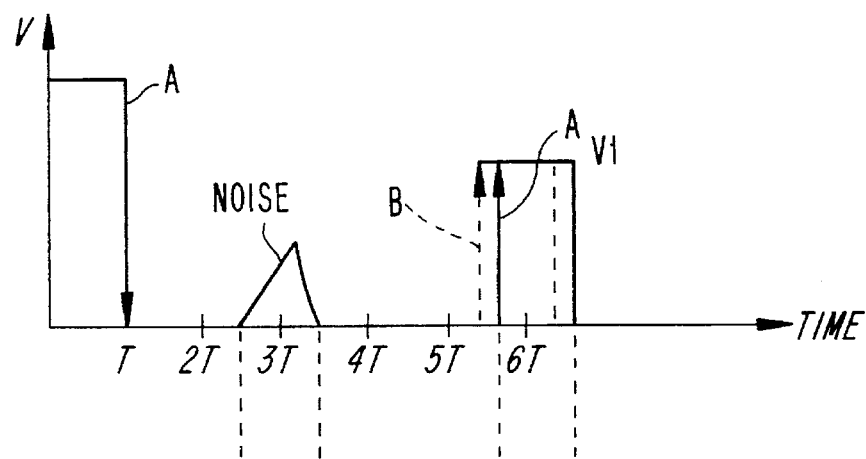
FIGS. 3A, 3B and 3C are graphs for illustrating wave form operations applied to an embodiment of the present invention, where.

The pulse signal supplied to the inverting terminal (−) of the operation amplifier (OP1) is amplified to thereby form an "A" waveform as illustrated in FIG. 3A for an input into the input terminal (A/D) of the microcomputer 5.

Figure 3B:
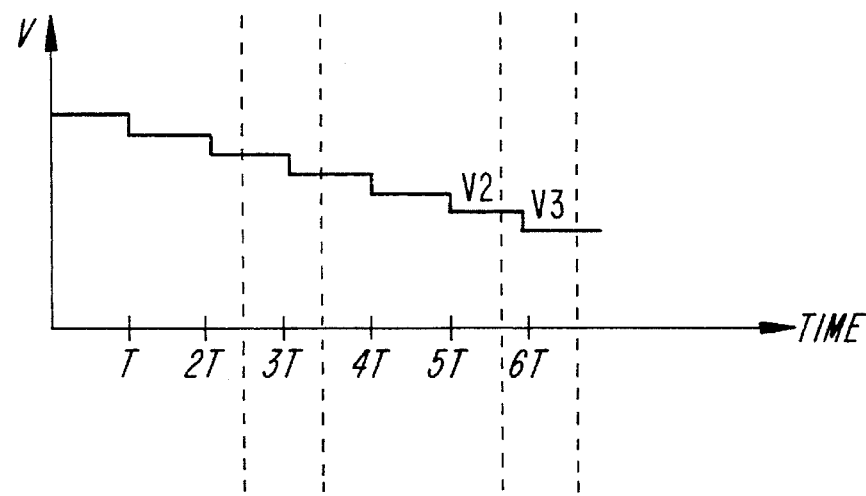
Figure 3C:
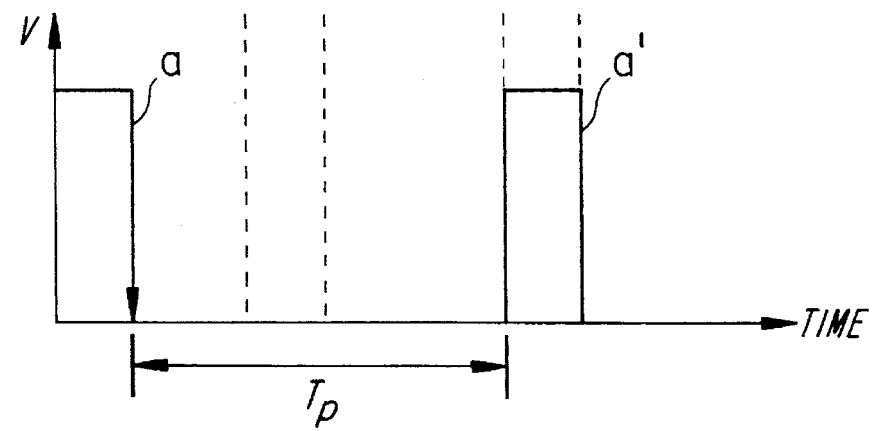

At the same time, the pulse signal changes into an "a" waveform as illustrated in FIG. 3C to thereafter be supplied to the non-inverting terminal (+) of the comparator 9.

Furthermore, when the ultrasonic waves are transmitted in the aforesaid process, a reference signal as illustrated in FIG. 3B is output from the output terminal (D/A) of the microcomputer 5 with its output level changing for every A/D conversion time.

The comparator 9 compares the signal output from the amplifying unit 3 with the reference signal illustrated in FIG. 3B and output from the terminal (D/A) of the microcomputer, and if the signal from the amplifying unit 3 is bigger than the reference signal output from the terminal (D/A) of the microcomputer, a signal of high level is output.

Then, the microcomputer discriminates whether the "a" waveform signal is on a trailing edge after receipt of the "a" waveform signal illustrated in FIG. 3C and output from the comparator 9 through the input terminal (INT), step 2 (S2).

As a result of discrimination at the step 2 (S2), if it is discriminated that the "a" waveform signal supplied to the input terminal (INT) of the microcomputer 5 is on the trailing edge (in case of yes), flow proceeds to step 3 (S3), and the microcomputer 5 operates an inner counter (not shown) in order to count the system clock.

As soon as the inner counter of the microcomputer 5 starts the counting operation at the step 3 (S3), the microcomputer 5 converts the signal input through the terminal (A/D) to a digital signal in order to discriminate whether or not the ultrasonic wave transmitted through the ultrasonic wave sensor 1 is the signal reflected from the obstacle.

In other words, the microcomputer 5 discriminates whether it is time for A/D conversion, and if it is discriminated that the time is for A/D conversion (in the case of yes), flow advances to step 5 (S5) to perform the interrupt routine for discriminating the distance to the obstacle.

If the signal is discriminated at the step 5 (S5) as the "A" waveform signal (illustrated in FIG. 3A) by the microcomputer which has performed the interrupt routine by way of the A/D conversion, the microcomputer at step 6 (S6) takes as a first time a time (6T) when a leading edge of the "A" waveform signal has been generated.

Of course, if the signal is not supplied through the terminal of the microcomputer 5 for every A/D conversion time at step 4 (S4), the first time is not obtained at steps 5 and 6 (S5 and S6) and operations subsequent to step 7 (S7) are performed.

At this location, a predetermined reference voltage established according to a voltage level of a received signal which varies according to the distance to the obstacle has already been stored in the microcomputer 5.

It other words, as illustrated in FIG. 3B, the voltage value of the received signal which varies according to the A/D conversion time (T, 2T, 3T, . . . , 6T) is stored in an inner memory of the microcomputer 5.

Accordingly, event though the "A" waveform signal lowered in its level, as illustrated in FIG. 3A, by the distance to the obstacle, is received, the "A" waveform signal illustrated in FIG. 3A is detected by levels of reference voltages (V2 and V3) lowered and illustrated in FIG. 3B.

At this time, the time is all discriminated as 6T regardless of whether the "A" waveform signal as illustrated in FIG. 3A is input through the input terminal (A/D) of the microcomputer 5 or a "B" waveform signal is input. II If the first time (6T) is obtained according to the "A" waveform signal supplied to the input terminal (A/D) of the microcomputer at step 6 (S6), the microcomputer 5 at step 7 (S7) discriminates whether the "A" waveform signal input to the input terminal (INT) and illustrated in FIG. 3A is on the leading edge, and if it is discriminated that the signal is on the leading edge (in the case of yes), the flow proceeds to step 8 (S8) and the microcomputer 5 performs the interrupt routine in order to discriminate the distance to the obstacle with the signal input to the input terminal (INT).

In other words, when a comparative reference signal is output from the output terminal (D/A) of the microcomputer 5, as illustrated in FIG. 3B, the comparator 9 compares the "A" waveform signal input from the amplifying unit 3A with the comparative reference signals (V2 and V3) and outputs the signal compared therefrom.

In other words, the comparator 9 outputs an "a" waveform signal as illustrated in FIG. 3C.

The microcomputer 5 receives the compared signal through the input terminal (INT) and, at step 9 (S9), takes the same as a second time (Tp) up to a time when the leading edge of the "a" waveform signal has occurred.

At this location, if a noise signal is received as illustrated in FIG. 3A, the signal is discriminated as noise because the signal is smaller than the reference voltage of a predetermined level output from the output terminal (D/A) of the microcomputer 5 and illustrated in FIG. 3B.

The microcomputer 5 obtains at step 9 (S9) the second time (Tp) according to the "a" waveform signal input to the input terminal (INT) and illustrated in FIG. 3C, and the microcomputer 5, at step 10 (S10) discriminates whether the first time (6T) and the second time (Tp) both all obtained according to the signal data input to the input terminal (A/D) and to the input terminal (INT).

If it is discriminated that both the first time (6T) and the second time (Tp) are not obtained (in the case of no), the microcomputer 5 keeps performing repeated operations subsequent to step 3A (S3).

If it is discriminated at the above process that the first time (6T) and the second time (Tp) are both obtained (in the case of yes), flow proceeds to step 11 (S11), and the microcomputer 5 discriminates whether the first time (6T) data and the second time (Tp) data obtained therefrom are mutually corresponding within an established error limit.

In other words, the microcomputer 5 discriminates whether the data difference between the first time (6T) and the second time (Tp) is within the established error limit.

If it is discriminated at the step 11 (S11) that the first time data and the second time data are mutually corresponding within the established error limit (in the case of yes), in other words, if it is discriminated that the received signal is a signal reflected from the obstacle, flow advances to step 12 (S12) to thereby convert the second time obtained to a distance representing the actual distance of the obstacle.

The data is now taken as the actual distance to the obstacle, and operation sequence for measuring the distance to the obstacle is then finished.

Meanwhile, if it is discriminated at the step 11 (S11) that the first time data and the second time data are not mutually corresponding within the errors limit (in the case of no), flow proceeds to step 13 (S13), and the microcomputer 5 discriminates now the received input signal as noise, repeats performance of operations subsequent to step 3 (S3 ) and keeps performing the operations for measuring the distance to the obstacle.

As seen from the foregoing, according to the apparatus and method for distance measurement an obstacle utilizing the ultrasonic wave sensor, the A/D conversion time is not relied upon in the measurement of the distance to the obstacle, but a time by way of the system clock is counted to thereby obtain an effect of accurately measuring an actual distance to the obstacle against the time according to the input signal of the comparator.

Although the above description describes a preferred embodiment of the present invention, it should be noted that still other variations and modifications are possible without departing from the concept and scope of the present invention.

What is claimed is:

1. An apparatus for measuring distance to an obstacle, the apparatus comprising:

an ultrasonic wave sensor for transmitting and receiving an ultrasonic wave; and a microcomputer for calculating distance to an obstacle by counting a system clock until the ultrasonic wave is received by the ultrasonic wave sensor after the ultrasonic wave is transmitted to and reflected from the obstacle;

wherein the microcomputer receives signals transmitted to and received from the ultrasonic wave sensor through an analog-to-digital conversion terminal to thereby calculate a second distance to the obstacle and compares the second distance to the obstacle to the distance to the obstacle calculated by counting the system clock, and if the difference between the two distances is greater than a specified value, discriminates as noise the signal received by the ultrasonic wave sensor, and if the difference between the two distances is less than the specified value, discriminates as an actual distance the distance to the obstacle calculated by counting the system clock.

2. The apparatus as defined in claim 1, wherein the reference signal is a signal output from the microcomputer.

3. A method of measuring a distance to an obstacle utilizing an ultrasonic wave sensor and a microcomputer, the method comprising the steps of:

driving the ultrasonic wave sensor to transmit an ultrasonic wave and simultaneously counting a main clock; and stopping the counting of the main clock to thereby calculate the distance to the obstacle by way of count numbers of the main clock when the ultrasonic wave is received by the ultrasonic wave sensor after being reflected by the obstacle;

wherein the step of stopping the counting includes:

receiving signals transmitted to and received from the ultrasonic wave sensor through and analog-to-digital conversion terminal to thereby calculate a second distance to the Obstacle;

comparing the second distance to the obstacle to the distance to the obstacle calculated by counting the system clock;

discriminating as noise the signal received by the ultrasonic wave sensor if the difference between the two distances is greater than a specified value; and discriminating as an actual distance the distance to the obstacle calculated by counting the system clock.

* * * * *